Dec. 9, 1924.　　　　　　　　　　　　　　　　1,518,243
C. R. BIRDSEY
APPARATUS FOR BINDING THE EDGES OF PLASTER WALL BOARD
Filed Sept. 22, 1922　　　7 Sheets-Sheet 1
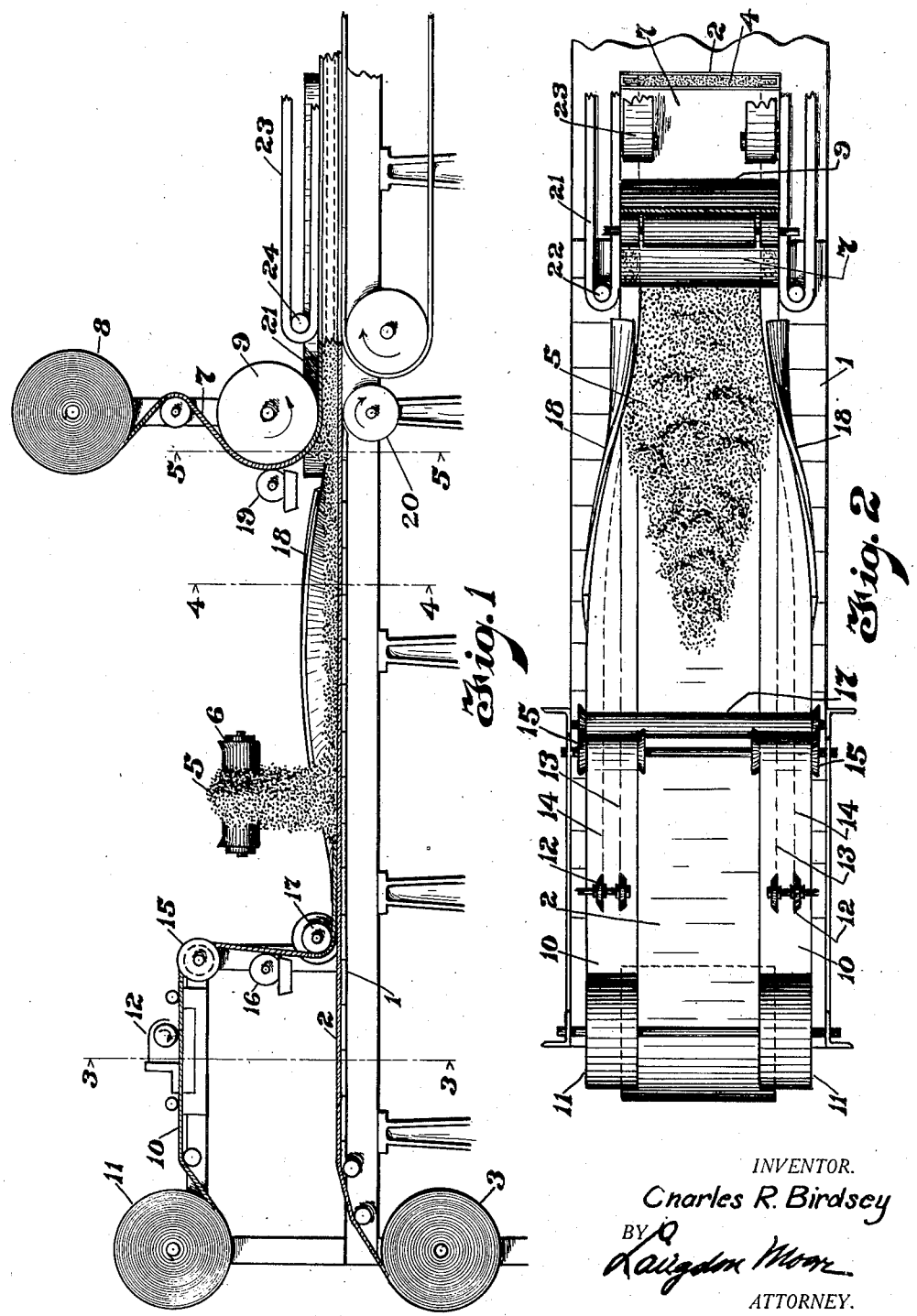
INVENTOR.
Charles R. Birdsey
BY
Langdon Moore
ATTORNEY.

Dec. 9, 1924.
C. R. BIRDSEY
APPARATUS FOR BINDING THE EDGES OF PLASTER WALL BOARD
Filed Sept. 22, 1922
1,518,243
7 Sheets-Sheet 3
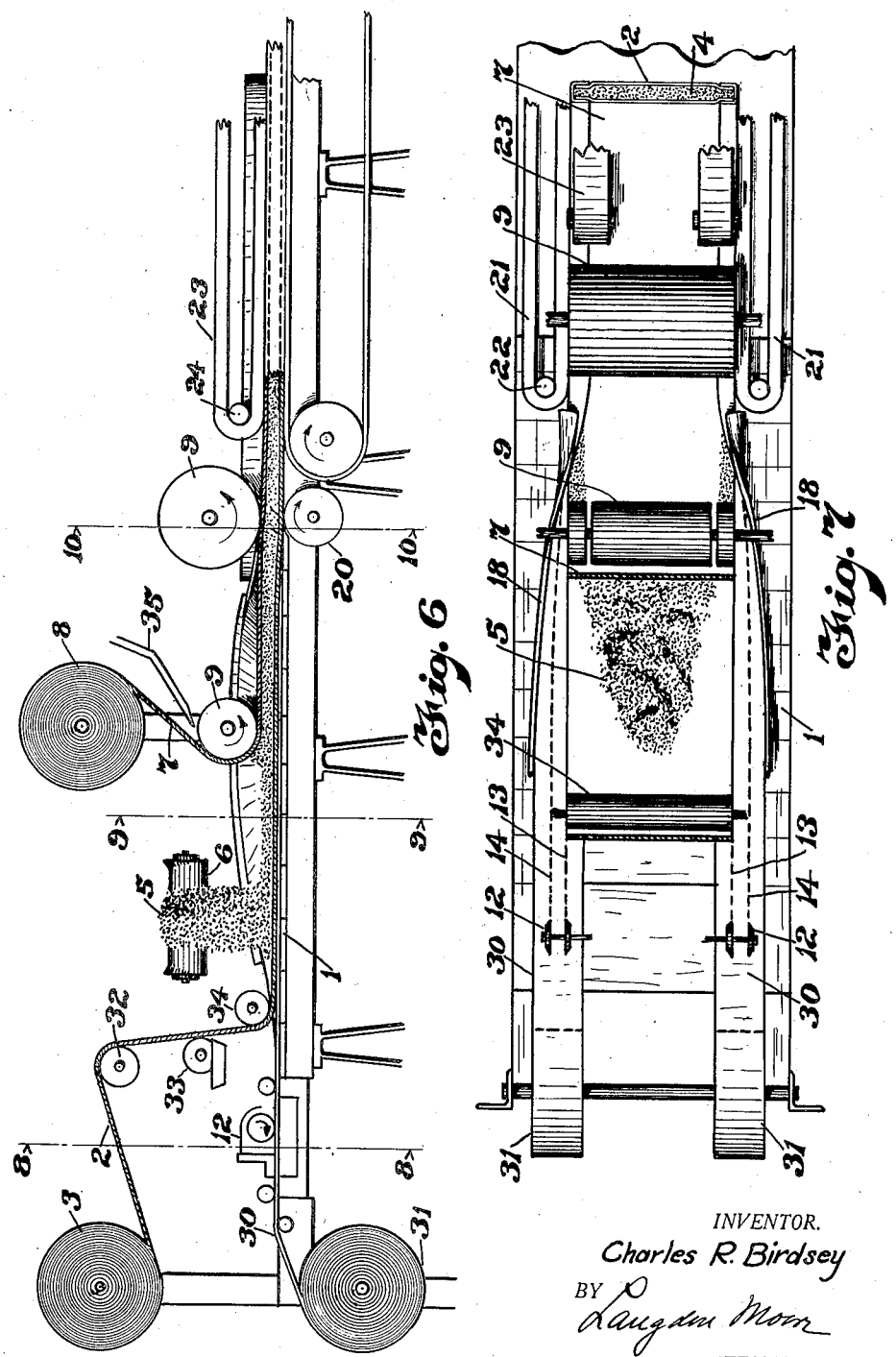
INVENTOR.
Charles R. Birdsey
BY
ATTORNEY.

Dec. 9, 1924.
C. R. BIRDSEY
1,518,243
APPARATUS FOR BINDING THE EDGES OF PLASTER WALL BOARD
Filed Sept. 22, 1922   7 Sheets-Sheet 5
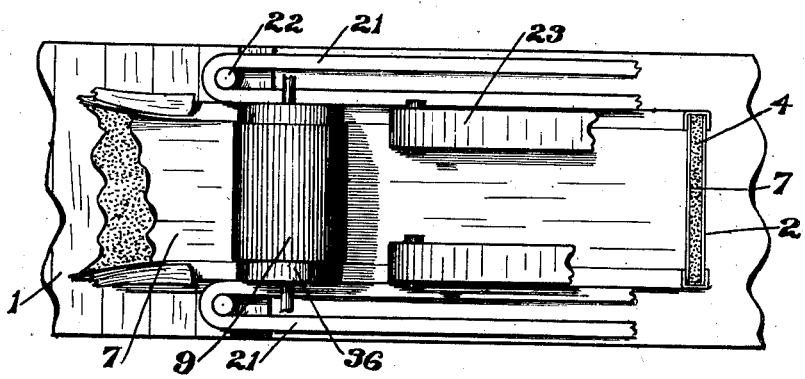
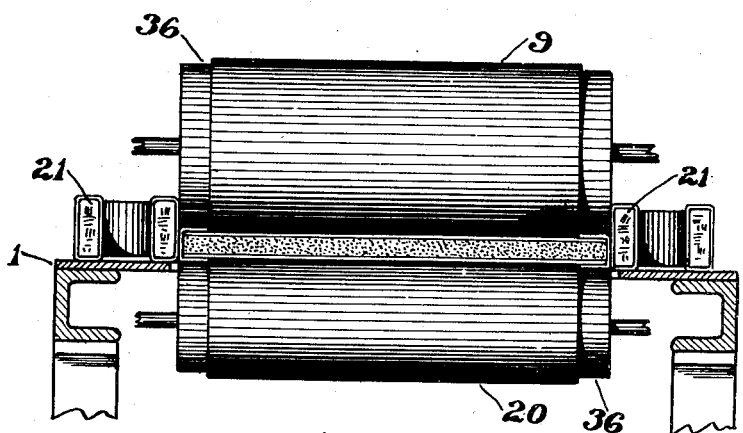
INVENTOR.
Charles R. Birdsey
BY
ATTORNEYS.

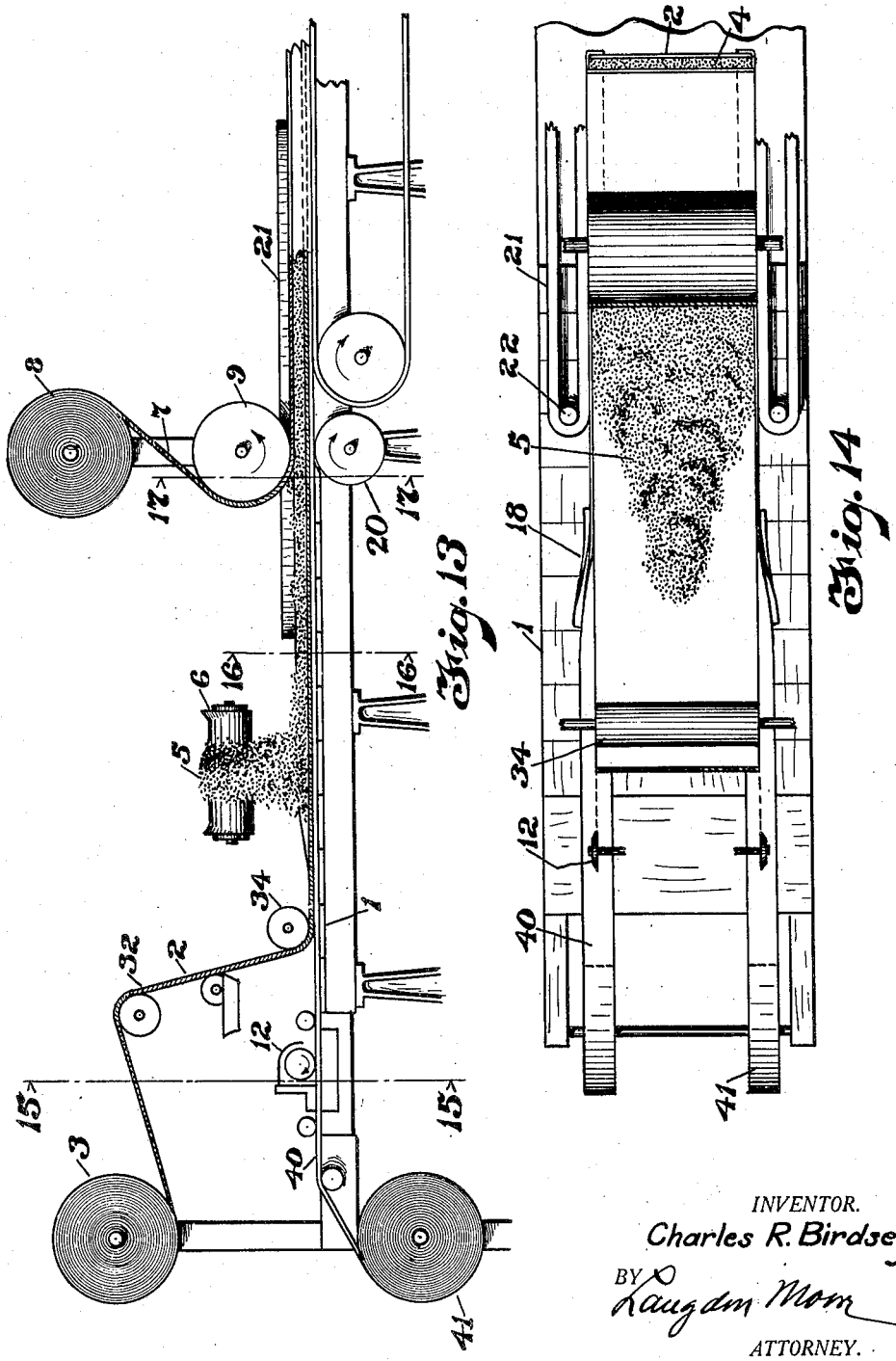

Dec. 9, 1924.
C. R. BIRDSEY
1,518,243
APPARATUS FOR BINDING THE EDGES OF PLASTER WALL BOARD
Filed Sept. 22, 1922
7 Sheets-Sheet 7

INVENTOR.
Charles R. Birdsey
BY
ATTORNEYS.

Patented Dec. 9, 1924.

1,518,243

UNITED STATES PATENT OFFICE.

CHARLES R. BIRDSEY, OF HINSDALE, ILLINOIS, ASSIGNOR TO UNITED STATES GYPSUM COMPANY, OF CHICAGO, ILLINOIS, A CORPORATION OF ILLINOIS.

APPARATUS FOR BINDING THE EDGES OF PLASTER WALL BOARD.

Application filed September 22, 1922. Serial No. 589,782.

*To all whom it may concern:*

Be it known that I, CHARLES R. BIRDSEY, a citizen of the United States, residing at Hinsdale, in the county of Du Page and State of Illinois, have invented new and useful Improvements in Apparatus for Binding the Edges of Plaster Wall Board, of which the following is a specification.

This invention relates to improvements in the construction of plaster board, more particularly to an apparatus for binding the edges of plaster wallboard.

It is the object of this invention to provide an apparatus which with but little change in the detail and without departing from the general spirit of this invention, will be adapted to construct the different types of plaster wallboard described in my prior Patent 1,395,032 of October 25, 1921, and pending application, Serial No. 434,652 filed January 3, 1921.

It is customary in this art to make plaster board continuous on machines by advancing the bottom cover sheet of fibrous material over a flat table, depositing the plaster body in a plastic state upon the bottom cover sheet and then applying a top cover sheet of fibrous material thereover, pass both sheets with the plastic material between them through forming rolls, and after leaving the forming rolls deliver the board so formed in a continuous strip to a conveyor which carries the board on a great enough distance to allow the plastic body to set sufficiently to maintain its shape and allow the board to be cut into lengths removed from the conveyor and transferred to the drying kiln. Since the apparatus is of this general character it is not considered necessary to illustrate or describe it in its entirety, as the only difference from the usual construction occurs at the board forming end of the apparatus.

The apparatus hereinafter described is adapted to make a plaster wall board of that type in which the longitudinal edges are covered or bound; and this invention includes the method of applying the additional covering or binding strips to protect the longitudinal edges of the plaster body which would otherwise be exposed between the edges of the cover sheet.

While the preferred form of apparatus is illustrated upon the accompanying sheets of drawing, and the preferred method of binding the edges of the plaster wallboard is described in this application, yet it is to be expected that minor detail changes may be made without departing from the scope of the invention.

Figure 1 is a view in side elevation, partly in section, of the forming end of the apparatus for forming the board described in my Patent 1,395,032.

Figure 2 is a top plan view of Figure 1, with parts removed.

Figure 6 is a view in side elevation, partly in section, and Figure 7 is a top plan view of the same, with parts removed, illustrating a modified form of apparatus for producing one type of wallboard originally disclosed in my application Serial No. 434,652.

Figure 8:
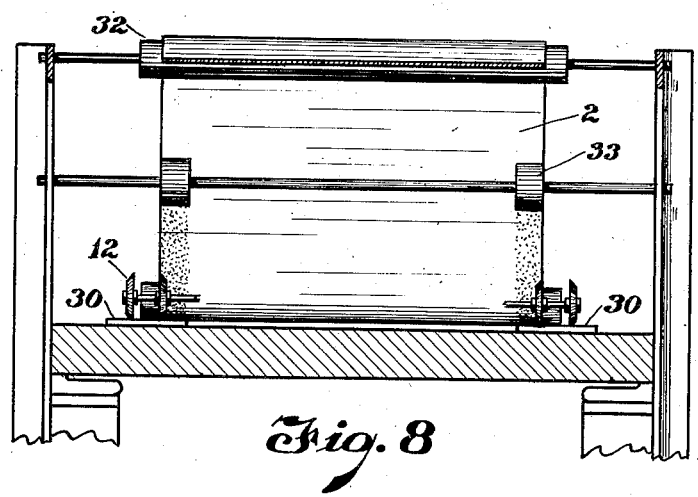
Figure 9:
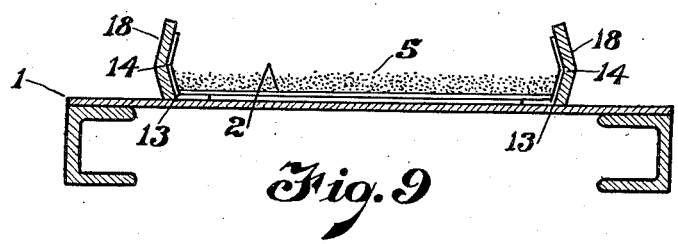
Figure 10:
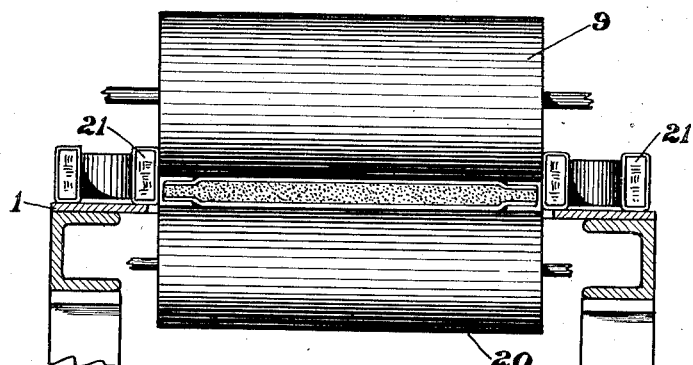

Figures 8, 9 and 10 are transverse sectional views taken on line 8—8, 9—9, and 10—10, respectively of Figure 6.

Figure 11 is a view similar to Figure 7, and Figure 12 similar to Figure 10, illustrating a slight change in apparatus of these figures for producing a slightly different form of edge binding, as originally illustrated in my application Serial No. 434,652.

Figures 13 and 14 are views in side elevation, partly in section and top plan view, with parts removed, respectively, of the forming end of the apparatus for producing another type of board shown in my application.

Figure 15:
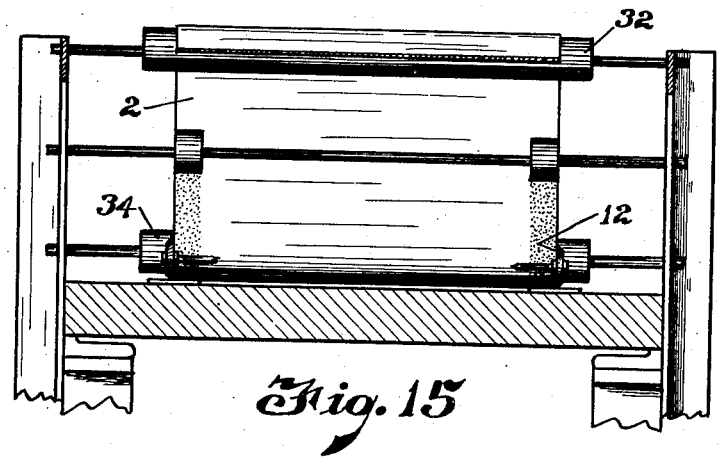
Figure 16:
Figure 17:
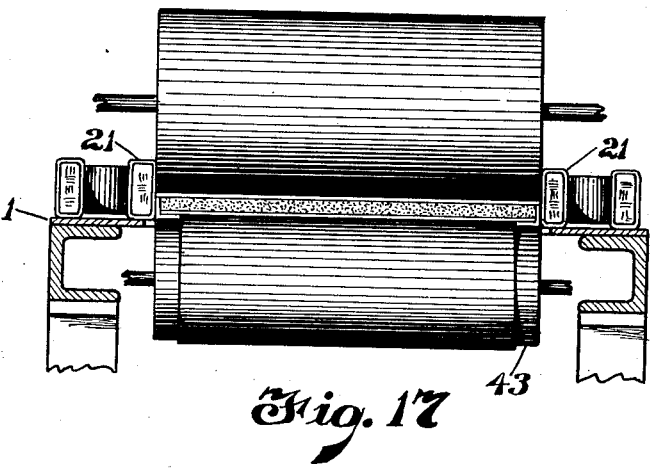

Figures 15, 16 and 17 are transverse sectional views taken on lines 15—15, 16—16, and 17—17 respectively, of Figure 13.

Figure 5:
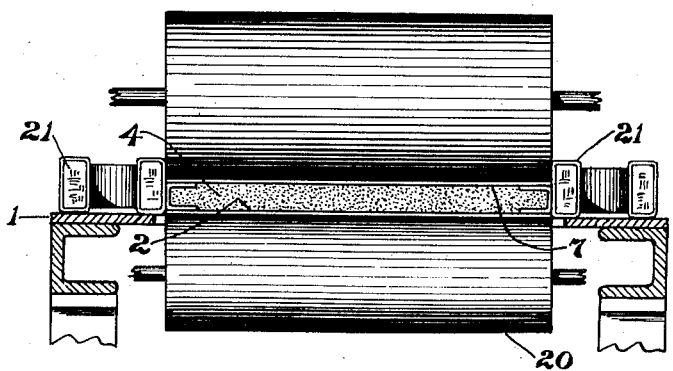
Figure 5 is a similar view taken on line 5—5 of Figure 1.

The apparatus illustrated in the first five figures of drawing is constructed to produce the plaster wallboard described in my Patent 1,395,032, and is illustrated in transverse section in Figure 5, from which it is seen that the top and bottom paper cover sheets are of equal width with the longitudinal edges of the opposite sheets in alignment, and the plaster body container between the cover sheets is retained therein at each longitudinal edge by additional binding strips so formed that the margins of each strip are bonded respectively to the interior margins of the top and bottom cover sheets with the main body of the strip covering the edge of the plaster body between the aligned edges of the cover sheets.

As shown upon the drawing, this improved apparatus comprises a flat table 1 over which the bottom sheet 2 of fibrous material is advanced from a roll 3 supported upon the frame of the table. The plaster body 4 is deposited in a plastic mass 5 from a conveyor 6 upon the bottom sheet 2 over which the top fibrous cover sheet 7 is applied from a roll 8 supported upon the frame above the table, by passing over a forming or pressure roll 9.

The binding strips 10 are applied to each edge of the bottom sheet as it advances over the table and as the plastic mass is being deposited thereon. Each binding strip is supplied from a roll 11 supported upon the frame, preferably above the table and each is preferably scored to assist the later folding of the strip and secure a square edge; desirability of which is seen in cross sectional view illustrated in Figure 5. The scoring devices 12 impart parallel lines 13 and 14 of reduced thickness of equal distance apart upon each strip as the strip advances from its roll.

Figure 3:
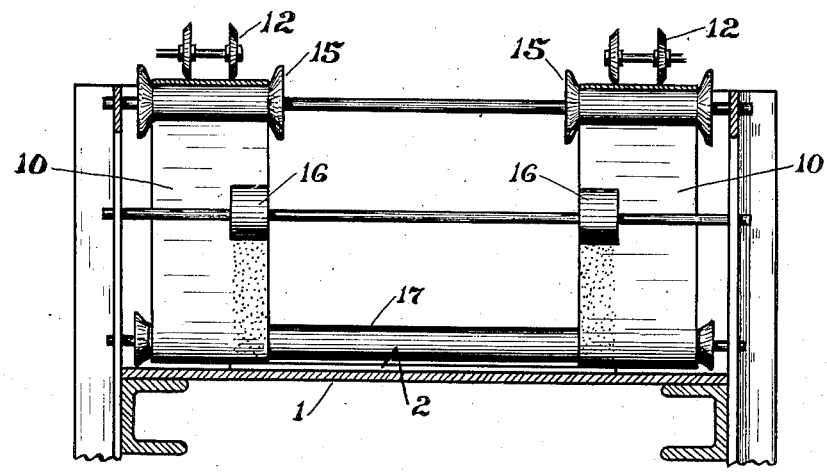
Figure 3 is a view in transverse taken on line 3—3 of Figure 1, looking in the direction of the arrows.
Figure 4:
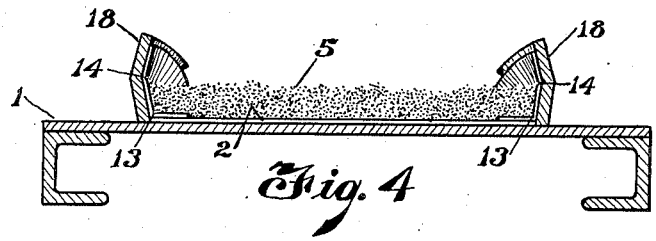
Figure 4 is a similar view taken on a line 4—4 of Figure 1.

Since it is necessary to apply the innermost margins of each strip between the innermost scored lines upon the margins of the upper side of the bottom cover sheet with the scoring aligned with the edges of the sheet, it is preferable to pass the strips over spools 15 which will insure a proper application. Since the under side of the margins of the strips contact with the upper side of the margins of the bottom sheet, it is preferable to apply an adhesive such as silicate of soda to the under side of the margins of the strips by a device 16 of any preferred construction and then pass the strips under a pressure roll 17 for causing the adhesive to bind the two together. As the bottom sheet advances with the binding strips attached to each margin of the sheet, the plastic mass 5 is deposited centrally of the bottom sheet and will, of its own weight, spread toward the edges. To fold the strips along the innermost scored lines to an upright position, and then fold the upper margins over on to the plastic mass, pick-up and folding members 18 are provided on each side of the table between the point where the plastic mass is deposited and the forming roll. These pick-up and folding members not only fold the binding strips attached at their margins to the bottom sheet, as illustrated in Figure 4, but also cause these strips to retain the plastic body upon the bottom sheet. Since the margins of the top cover sheet 7 contact with the outer surfaces of the bent-in margins of the binding strips, it is preferable to apply a solution of silicate of soda or other adhesive to the margins of this sheet before it passes over the pressure roll 9, which may be done by the apparatus 19 illustrated, or any preferred device. While not necessary, it is preferable to provide an additional forming roll 20 mounted on the under side of the table in line with the upper forming roll. It is preferable that both of these rolls be of the same width as the width of the paper; and that portion of the binding strip between the folded-in margins along the edges of the board be supported by endless belts 21 pasing over vertical pulleys 22, extending from a short distance in front of the forming rolls to a sufficient distance therebeyond to allow the plaster body to set enough to maintain the shape of the board. In order to insure the bonding of the exterior portions of the bent-in margins of the strips, to the gummed surface of the inner margins of the cover sheets, it is preferable to provide pressure belts 23 traveling over horizontal pulleys 24 arranged over the margins of the board extending from adjacent the far side of the forming roll a sufficient distance therefrom to insure this bonding.

Figures 6 to 10 inclusive illustrate an apparatus to produce the modified form of board shown in my Patent 1,395,032, and is clearly illustrated in cross section in Figure 10, which board differs only from the one heretofore described, in that, the binding strips are applied to outside margins of the cover sheets and the margins so inclosed are depressed so that the portions of the strips embracing the edges of the board are aligned with the outer surfaces of the board.

The apparatus illustrated is nearly the same as the one heretofore described, the main difference being the manner of applying the binding strips. In this case the binding strips 30 are advanced over the flat table 1 and a scoring device imparts two parallel lines 13 and 14 of reduced thickness to each strip just before they enter onto the table from rolls 31 preferably supported below the table. The bottom cover sheet 2 is advanced from a roll 3, preferably supported by the frame above the table and laid over guide rolls 32 so that it will lie over the margins between innermost scored lines 13 on the strips 30 and it is preferable to apply an adhesive to the margins of this cover sheet as it passes over the guide rolls by the device 33 shown or in any other manner, and provide a pressure roll 34 at the point where the bottom cover sheet engages the table and in order to insure a bonding between the gummed margins and the binding strips. The plaster body 4 is applied by depositing it in a plastic mass 5 from a conveyor 6 upon the bottom sheet as it advances toward the pressure or forming rolls. Pick-up and folding members 18 are provided on each side of the table which engage under the binding strips 30 and fold them forward along the innermst scored lines 13, and then fold the upper margins of the strips inwardly as heretofore described. The top cover sheet 7 is applied over the plastic body by advancing it from a roll 8 supported upon the frame above the table over a guide roll 9 to cause the sheet to rest over the plastic body before the upper margins of the binding strips are bent inwardly. To insure a proper bond between the margins of the outer surface of the top cover sheet, and the inner surface of the margins of the binding strips an adhesive is applied to the margins of the cover sheet by the device 35 illustrated, or any other desired means. Pick-ups and folders 18 then cause the upper margins to be folded inward along the upper scored lines 14 to engage the outer surface of the top cover sheet, and the plastic mass between the two cover sheets, with their edges inclosed by binding strips, pass between the pressure or forming rollers 9, and 20, which will cause the depression of the margins of the embracing binding strips 30 and squeeze together the margins of the cover sheets so that the outer surfaces of the board will be flat throughout. During the forming operation, it is preferable to support the edges by endless belts 21 passing over vertical pulleys 22, arranged on each side of the table extending from a position in the rear of the forming roll and far enough therebeyond to allow the plaster body to set sufficiently to maintain the shape of the edge. If desired pressure belts 23 such as heretofore described may be arranged over the upper margins of each binding strip to insure the bond between the strips and sheets.

Figures 11 and 12 illustrate a slight modification of this type of board as disclosed in my application Serial No. 434,652 in which, as readily seen by cross sectional view of Figure 12, the exterior margins of the binding strips 30 are not depressed and extend beyond the surface of the sides of the board. The only difference in this apparatus from that just above described, is that each end of each forming roll 9 and 20 is provided with a depressed portion 36 equalling in depth the thickness of the binding strip and in width the width of the exterior margin of the binding strip. Since the operation of this apparatus is obvious, it is not thought necessary to describe it further.

Figures 13 to 17, illustrate the application of this apparatus to the production of the board shown in my application Serial No. 434,652, and is disclosed in cross section, Figure 17, from which it will be seen that the binding strips do not completely embrace the edges of the board as heretofore described. The strips are narrower and engage only the margin of one cover sheet with a portion extending over the edge of the plastic body and terminated under the marginal edge of the other sheet.

This apparatus is very similar to the one just above described, inasmuch as the binding strips 40 are advanced from rolls 41 supported by the frame below the table 1, passing through scoring devices 12 and thence on to the flat table 1, with the bottom cover sheet 2, advancing from a roll 3 supported by the frame above the table over guide rolls 32 onto the table with device 33 for applying the adhesive to the inside margins of the cover sheet and over a pressure roll 34 for insuring the gummed margins contacting with the margins of the binding strips. The scoring devices 12 in this instance impart a single line of reduced thickness approximately at the center of the binding strip with the width of the margin of the strip extending beyond the edge of the bottom sheet of the width equal in thickness of the board less the thickness of the top cover sheet. The plaster body 4 is applied in a plastic mass 5 from a conveyor 6 and deposited on the bottom sheet as it advances toward the forming rolls. Pick-up and folders 18 are arranged on each side of the table to pick-up the extending margins of the binding strips 40 as the bottom sheet and strips advance together and fold them upwardly at right angles to the bottom sheet. The top sheet 7 is applied by advancing it from a roll 8 supported by the frame above the table over the upper pressure roll 9, which will cause sufficient of the plaster mass banked up in front of this roll to enter between the upper extremities of the strip and the under edges of the top sheet to bond the two together. In this case it is preferable to either extend the pick-up and folders to a point beyond the pressure roll or to provide side belts 21 passing over pulleys 22 from a point adjacent the termination of the folding end of pick-ups across each end of the upper forming roll 9 to a point therebeyond a great enough distance for the plastic body to set sufficiently to maintain the edge and at the time to prevent the plastic mass banking up in front of the pressure roll from overflowing at the sides over the angular margins of the strips.

In this type of edge the portion of the binding strip on the exterior of the cover sheet is not depressed and therefore the lower pressure roll 20 is scored or reduced at each end, as at 43 for a width and thickness equal to the width and thickness of that portion of the binding strip.

From the illustrations of this apparatus and the above description of the construction and operation, it is readily seen that the apparatus may be modified to produce a board similar in cross section to that shown in Figure 17, in which the exterior portion of the binding portion of the binding strip may be depressed so that its exterior surface will lie in the same plane with the exterior of that side of the board, or the angular margin extending over the edge of the board may also lie over the exterior edge of the top cover sheet and be terminated in the plane of its exterior surface and it is therefore not thought necessary to illustrate or further describe this modification of the apparatus, as in the first instance it is only necessary to omit the reduced portions 43 on the ends of the bottom pressure roll so that this roll is a continuous cylindrical surface from end to end and in the latter case it is only necessary to reduce the width of the top sheet and increase the angular margins of the side strips. It is also possible by this apparatus to provide a board similar to that shown in the cross section, Figure 17, in which the margin of the strip lying in contact with the margins of the cover sheet, may be placed on the inside of the board similar to the margins of the strips shown in Figure 5, with the angular portion extending over the plaster body between the edges of the sheets. Since the only difference between the apparatus for making this type of board and that disclosed in the first five figures of the drawing, is that the strips are terminated at the outer line of scoring, it is not thought necessary to here illustrate or describe such an apparatus in any more detail.

I claim:

1. An apparatus for constructing plaster wallboard comprising means for advancing a bottom sheet of fibrous material upon a table, means for depositing a plastic mass upon the bottom sheet, means for applying a top sheet of fibrous material upon the plastic mass and means for applying edge binding strips of fibrous material retaining the plastic mass at the edge and bonded thereto.

2. An apparatus for constructing plastic wallboard comprising means for advancing a bottom sheet of fibrous material upon a table, means for depositing a plastic mass upon the bottom sheet, means for applying a top sheet of fibrous material upon the plastic mass, means for applying edge binding strips of fibrous material retaining the plastic mass at the edges and bonded thereto, and a board forming means forcing the top sheet down upon the plastic mass and forcing the mass against the edge binders.

3. An apparatus for constructing plaster wallboard comprising means for advancing a bottom sheet of fibrous material, means depositing a plastic mass thereon, means applying a top sheet of fibrous material, means applying edge binding strips of fibrous material retaining the plastic mass at the edges, means forcing the top sheet down upon the plastic mass and the mass against the edge binders and means supporting the edge binders during this action.

4. An apparatus for constructing plaster wallboard comprising means for advancing a plastic mass between cover sheets of fibrous material, means applying edge binding strips of fibrous material, board forming means, and means passing the plastic mass between the cover sheets retained at the edges therebetween by the edge binders through the board forming means.

5. An apparatus for constructing plaster wallboard comprising means for advancing a plastic mass between cover sheets of fibrous material, means applying edge binding strips of fibrous material between the margins of the cover sheets, board forming means, and means passing the plastic mass between the cover sheets retained therebetween by the edge binders with their margins engaging the margins of the cover sheets through the board forming means.

6. An apparatus for constructing plaster wallboard comprising means for advancing a plastic mass between cover sheets of fibrous material, means applying edge binding strips of fibrous material about the margins of the cover sheets, board forming means, and means passing the plastic mass retained between the cover sheets and embracing edge binder through the board forming means.

7. An apparatus for constructing plaster wallboard comprising means for advancing a plastic mass between cover sheets of fibrous material, means applying edge binding strips of fibrous material about the margins of the cover sheets, board forming means, and means passing the plastic mass retained between the cover sheets and embracing edge binder through the board forming means, said board forming means depressing the embracing margins of the edge binder flush with the flat sheet sides.

8. An apparatus for constructing plaster wallboard comprising means for advancing a plastic mass between cover sheets of fibrous material, means applying edge binding strips of fibrous material having a margin engaging one cover sheet, board forming means, and means passing the plastic mass between the cover sheets with the edges thereof closed by a portion of the edge binder with the remainder of the binder engaging the margins of the adjacent cover sheet through the board forming machine.

CHARLES R. BIRDSEY.